US005562819A

United States Patent [19]
Turner, Jr. et al.

[11] Patent Number: 5,562,819
[45] Date of Patent: Oct. 8, 1996

[54] APPARATUS FOR TRAPPING, SIGNALLING PRESENCE OF AND COLLECTING DEBRIS IN WATERWAYS

[75] Inventors: Richard R. Turner, Jr., West Nyack, N.Y.; Steven Hurwitt, Park Ridge, N.J.

[73] Assignee: Fresh Creek Technologies, Inc., Fairfield, N.J.

[21] Appl. No.: 555,256

[22] Filed: Nov. 8, 1995

Related U.S. Application Data

[63] Continuation of Ser. No. 229,541, Apr. 19, 1994, abandoned.
[51] Int. Cl.$^6$ ............................. B01D 17/12; B01D 35/02
[52] U.S. Cl. ................................. 210/85; 404/4; 210/94; 210/155; 210/162; 210/163; 210/170; 210/434
[58] Field of Search ....................... 210/85, 86, 94, 210/153, 154, 155, 170, 232, 323.1, 130, 132, 163, 164, 433.1, 434, 435, 446, 459, 460, 162; 404/2, 4, 5; 405/36, 37

[56] References Cited

U.S. PATENT DOCUMENTS

| 122,209 | 12/1871 | Ashman et al. | 210/163 |
|---|---|---|---|
| 226,620 | 4/1880 | Markey | 210/434 |
| 3,025,962 | 3/1962 | Williams | 210/86 |
| 3,332,552 | 7/1967 | Zabel | 210/86 |
| 4,483,640 | 11/1984 | Berger et al. | 210/170 |
| 4,689,145 | 8/1987 | Matthews et al. | 210/170 |
| 5,133,619 | 7/1992 | Murfae et al. | 404/4 |
| 5,232,587 | 8/1993 | Hegemier et al. | 210/170 |
| 5,372,714 | 12/1994 | Logue | 404/4 |
| 5,403,474 | 4/1995 | Emery | 404/4 |
| 5,405,539 | 4/1995 | Schneider | 210/170 |

FOREIGN PATENT DOCUMENTS

| 2-13622 | 1/1990 | Japan | 210/154 |
|---|---|---|---|
| 4-174145 | 6/1992 | Japan | 210/154 |
| 6-41939 | 2/1994 | Japan | 405/36 |

OTHER PUBLICATIONS

Fresh Creek Technologies, Inc., "Floatables" Bulletin, Sep. 1992.
Fresh Creek Technologies, Inc., "Shorelines" Newsletter, vol. 1, No. 1, Autumn 1992.
Fresh Creek Technologies, Inc., Product Bulletin #NTT 93-6, "In-Line Netting Trashtrap™", Jun. 9, 1993.
Fresh Creek Technologies, Inc., "Shorelines" Newsletter, vol. 2, No. 3, Summer 1993.

*Primary Examiner*—Joseph W. Drodge
*Attorney, Agent, or Firm*—Wood, Herron & Evans, P.L.L.

[57] ABSTRACT

Apparatus for trapping and collecting debris including an in-line trap contained in a subterranean chamber having an inlet and an outlet for connection to an underground conduit such as a sewer or storm drain conduit. The trap comprises a net being closed on all sides except on an inlet side which faces the inlet to the chamber. The chamber is contained in a vault having a set of upper doors and the bag is attached to a frame structure having suitable supports which may be grasped such that the bag may be lifted upwardly through the doors for replacement. An overflow weir is provided for allow flow past the trap when the bag is full of debris. Sensing systems are further provided for detecting and signalling when the bag is full. A multi-bag system is also disclosed in which at least two bags in parallel are provided such that one bag may accommodate overflow when the other is being serviced.

13 Claims, 2 Drawing Sheets

APPARATUS FOR TRAPPING, SIGNALLING PRESENCE OF AND COLLECTING DEBRIS IN WATERWAYS

This application is a continuation of prior application Ser. No. 08/229,541 filed Apr. 19, 1994, now abandoned entitled "APPARATUS FOR TRAPPING AND COLLECTING DEBRIS IN WATERWAYS".

BACKGROUND OF THE INVENTION

The present invention generally relates to the collection and removal of floating debris from waterways and, more particularly, to an in-line trap designed for use in a sewer or storm drain conduit.

Trash and debris floating on the surface of waterways is a highly visible form of water pollution which is receiving attention not only for its adverse, polluting effect but also because of its unaesthetic appearance on the surfaces of lakes and other water bodies. One generally effective means of collecting and removing floating debris consists of an array of surface mounted mesh nets installed in a receiving body of water in the flow path of a sewer outlet. Such a system is described in Vol. 2, No. 3, of Fresh Creek Technologies, Inc. "Shorelines" newsletter.

Because systems of this type are surface constructed, they are effective in collecting floatables for removal; however, they are highly visible and therefore not suitable for all installations. An in-line system, contained within a buried vault can be hidden from view and can be configured to capture both floating debris and velocity borne sinkable debris. Such a device is shown in Fresh Creek Technologies, Inc. Product Bulletin No. NTT 93-6.

Even in view of the in-line device shown in the above-mentioned product bulletin, improvements related to the capture of debris in waterways have become desirable as contemplated by the present invention.

SUMMARY OF THE INVENTION

It has been one object of the invention to provide underground, in-line apparatus for trapping and collecting debris in a sewer or storm flow conduit.

It has been a further object of this invention to provide a secondary trap which provides continued protection when primary collection traps are full.

It has been still a further object of this invention to provide a system which signals when primary bags are full and servicing is required.

It has been another object of this invention to provide a trapping facility in which bags may be replaced without loss of trapping protection during servicing.

To these ends, the present invention includes a substantially subterranean vault having a chamber with an inlet and an outlet each being adapted to be connected to a sewer or storm drain conduit. An in-line trap is disposed within the chamber between the inlet and the outlet for trapping and collecting debris entering at the inlet and thereby providing for an out-flow of substantially debris-free water. The vault includes an access opening comprising upper doors in the vault sized to allow the trap to be removed and replaced. The doors are designed to be substantially flush with the surrounding terrain.

The trap specifically comprises a perforated container having an open end facing the inlet of the chamber. Preferably, the perforated container is a flexible mesh bag attached to a frame structure having supports or handle means for allowing the frame, or at least a portion thereof connected to the bag, to be lifted out with the bag when the bag is full of captured debris.

A bypass weir is disposed adjacent the open end of the container and adjacent the inlet to the chamber. Specifically, the bypass weir comprises a relatively short wall extending between an end wall of the chamber which includes the chamber inlet and the open end of the bag. The wall of the bypass weir normally directs flow from the chamber inlet through the open end of the trap but allows flow to bypass the trap and flow to the chamber outlet when the trap is full of debris.

Sensing and signalling means is preferably disposed adjacent the bypass weir for sensing and signalling the passage of solid debris past the bypass weir and around the trap and thereby indicating that the trap is full of debris and is in need of servicing. More particularly, the sensing and signalling means may comprise a mechanical structure which permits passage of water, but is displaced by impingement of solid debris flowing past the bypass weir and around the trap. Displacement of the mechanical structure signals when the trap is full of debris, for example by actuating a visible flag above ground or by actuating an electrical switch which activates an above-ground indicator or remote indicator. Alternatively, the sensing and signalling means may comprise an optical sensor for detecting the passage of debris past the bypass weir and around said trap. Upon detection of debris, the optical sensor emits a signal indicating that the trap is full of debris. The signal may, for example, activate an above-ground indicator or a remote indicator.

A multi-trap system is further disclosed wherein the subterranean chamber includes at least first and second side-by-side traps. Upon filling of the first trap, the flow and debris is diverted over a bypass weir disposed between the inlet ends of the first and second traps. The flow is thereby directed through the second trap such that overflow debris is trapped and collected. Finally, closure panels may be provided in stationary frame structure disposed adjacent the inlet ends of the traps in either the single-trap system or the multi-trap system to restrain debris from flowing through the chamber during servicing.

Further objects and advantages of the present invention will become more readily apparent to those of ordinary skill upon review of the following detailed description of the preferred embodiments taken in conjunction with the accompanying drawings.

DETAILED DESCRIPTION OF THE PREFERRED EMBODIMENTS

Figure 1:
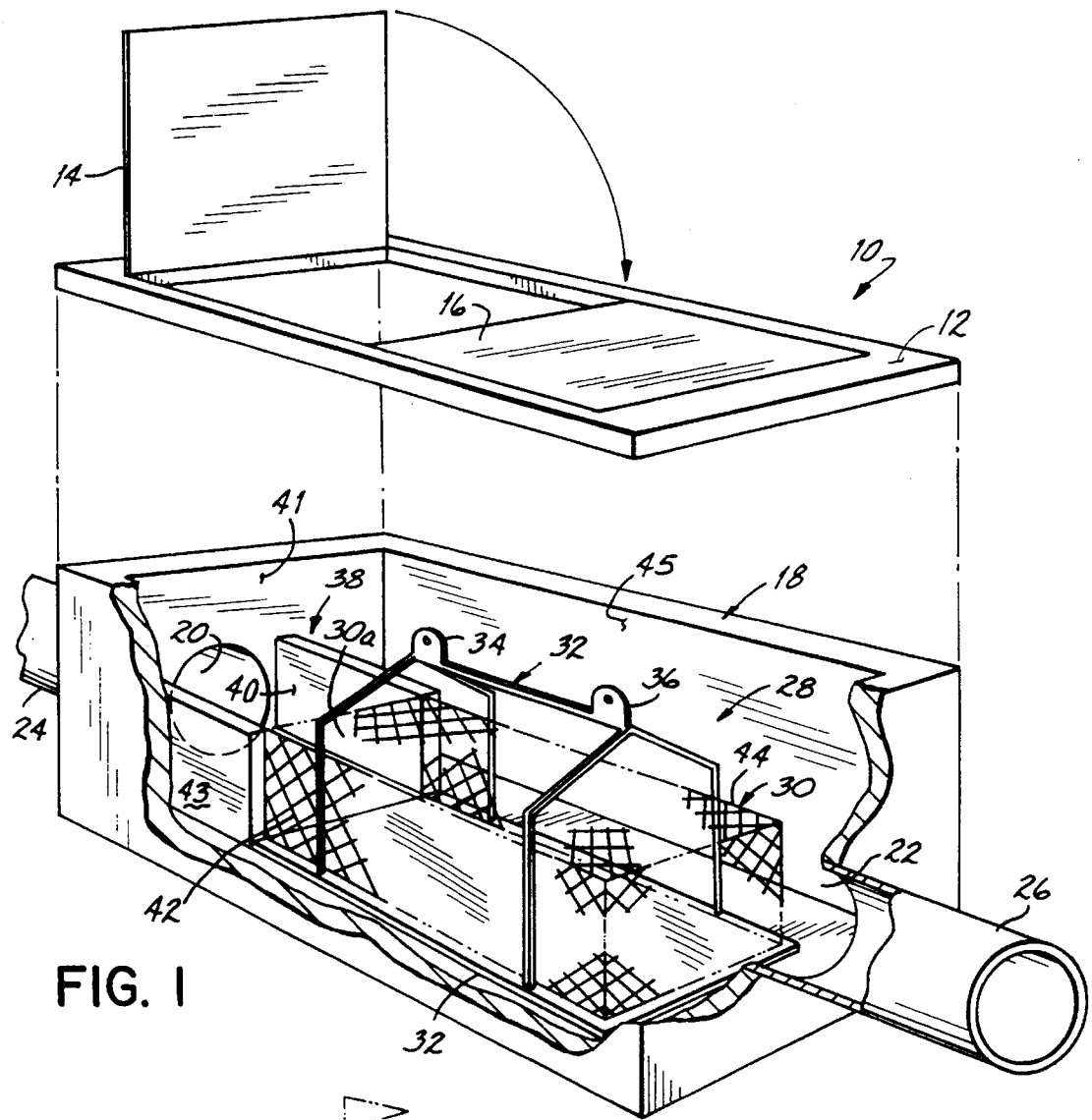
FIG. 1 is a perspective view of an in-line, single bag debris collecting apparatus having a single bag disposed in the path of a sewer or storm drain conduit.

Turning first to FIG. 1, a first embodiment of the present invention employing a single bag in-line trap includes a substantially subterranean vault 10 having, for example, a top 12 with a pair of doors 14, 16 for accessing a lower subterranean chamber 18. Top 12 is designed to be disposed level with the surrounding terrain. Chamber 18 includes an inlet 20 and an outlet 22 each being respectively connected to conduits 24, 26. Conduits 24, 26 may be storm drain or sewer conduits or may be connected thereto in a known manner. Between inlet 20 and outlet 22, chamber 18 includes an in-line trap 28. Specifically, an elongated perforated container or, more particularly, a mesh bag 30 attached to a frame structure 32 captures and holds floatable velocity borne debris entering chamber 18 through inlet 20. Perforations or openings in bag 30 may vary in size depending on the intended use, however, possible sizes range from about 0.1" to about 10". Bag 30 is open only on the end 30a thereof which faces inlet 20 of chamber 18. Upper support members 34, 36 are attached to frame structure 32 for allowing trap 28 to be lifted out of vault 10 through doors 14, 16 for periodic removal of captured debris.

A bypass weir 38 located upstream of trap 28 and on one side of inlet 20 permits necessary continued flow in the event that bag 30 is filled to capacity with debris and is not immediately replaced with an empty bag. More specifically, weir 38 comprises a wall 40 extending from an end wall 41 through which inlet 20 extends to a front inlet end 30a of bag 30 and having a height less than the height of chamber 18 such that flow may continue over wall 40 and around one side of bag 30. In this regard, bag 30 has one side 42 placed against or abutting a wall 43 in chamber 18 which also extends from end wall 41 to the opposite side of inlet end 30a. The other side 44 of bag 30 is spaced away from side wall 45 of chamber 18 such that flow may pass between side 44 of bag 30 and side wall 45 of chamber 18 when bag 30 is full. It will be appreciated that weir 38 and wall 43 normally direct flow into trap 28 until bag 30 thereof is full of debris. Ideally, bag 30 will be readily replaced when full such that debris will not be allowed to flow past weir 38 and through outlet 22 and conduit 26 for any great length of time.

Figure 2:
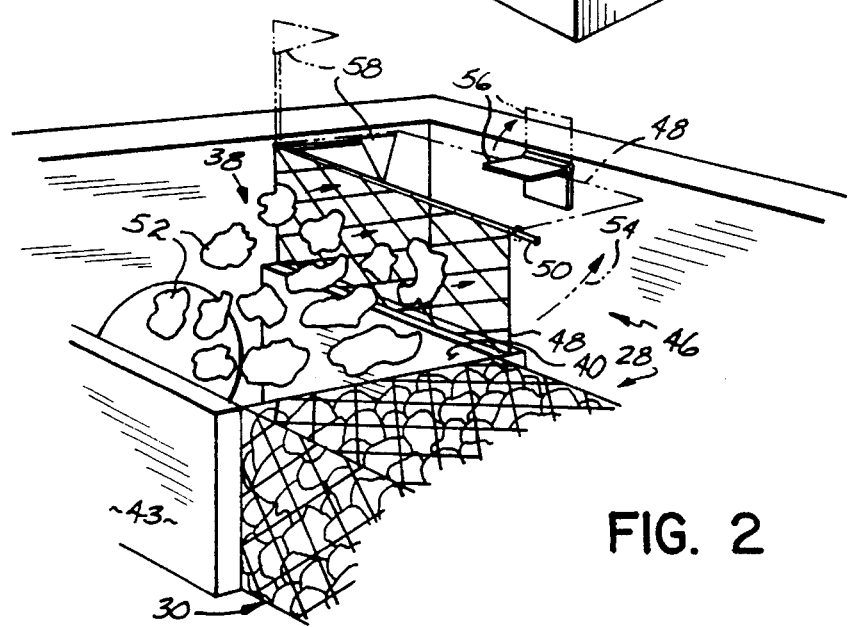
FIG. 2 is a perspective view of a mechanically operated system for signalling when the bag of FIG. 1 is full.
Figure 3:
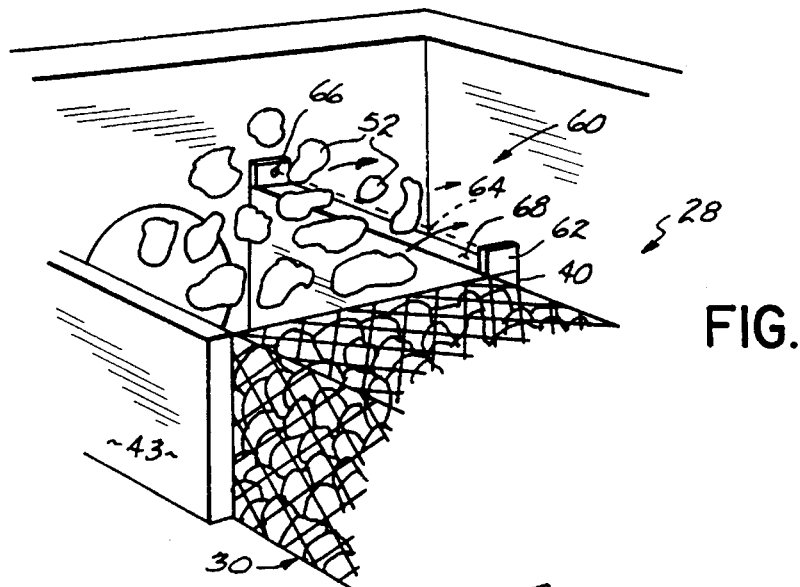
FIG. 3 is a perspective view of an alternative optical system for signalling when the bag of FIG. 1 is full; and, FIG. 4 is a perspective view of an alternative embodiment of the invention employing a multi-bag system.

To assist in knowing when bag 30 is in need of replacement or emptying, sensing and signalling mechanisms may be provided as shown in FIGS. 2 and 3. FIG. 2 shows the addition of a mechanical signalling system 46 to signal a full bag condition and indicate the need for service. In this regard, a perforated grating panel 48 is suspended from a pivot shaft 50 over the top of bypass weir 38 and, specifically, over wall 40. Water flowing through inlet 20 can pass through grating panel 48 without disturbing its position. Solid debris 52, however, which cannot enter bag 30 because of a full bag condition is carried over wall 40 and causes grating panel 48 to pivot around pivot shaft 50 in the direction of arrow 54. A latch 56 then holds the grating panel in the open position. A signal flag 58, is connected to shaft 50 or panel 48 and pivots upwardly therewith. Flag 58 extends through a suitable opening (not shown) in top 12, above ground level, to provide continuous visual indication of the full bag condition.

FIG. 3 shows an optical sensing and signalling system 60 which signals a full bag condition. An optical transmitter 62 projects a light beam 64 to a photo-cell receiver 66. Transmitter 62 and photo-cell receiver 66 may be connected to opposite ends of upper surface 68 of wall 40 as shown in FIG. 3 and may comprise conventional optical sensing components. Any interruption of beam 64 by an opaque object passing by weir 38 or, more specifically, over wall 40 and around trap 28 creates an electrical signal indicating a full bag condition. Optionally, one or more additional optical signalling devices may be installed at greater heights from wall 40 to ensure that debris 52 passing above beam 64, as shown, is detected. Detection system 60 sends the electrical signal to one or more suitable sensory perceptible devices, such as an above-ground light (not shown) which indicates to the appropriate personnel that bag 30 must be replaced or emptied. Alternatively, detection systems 46 and 60 may be used to provide a local visual or audible signal, or can be equipped to transmit a signal by wire or by radio transmission to a remote location.

In both the embodiment shown in FIGS. 2 and 3, additional barrier walls, which may be perforated as by being formed of mesh material, may extend upwardly from wall 43 and from the top edge of inlet end 30a of bag 30. These barriers have not been shown for clarity. It will be appreciated that such barriers will ensure that debris 52 will have only one path through chamber 18 when trap 28 is full, i.e., the path created over wall 40 and past detection system 46 or 60.

Systems 46 and 60 act to significantly reduce the amount of debris 52 which escapes capture by quickly signalling a full bag condition, however, some debris 52 will inevitably pass trap 28 while waiting for service or during the bag changing operation, as the system is unprotected during removal and replacement or emptying of bag 30.

Figure 4:
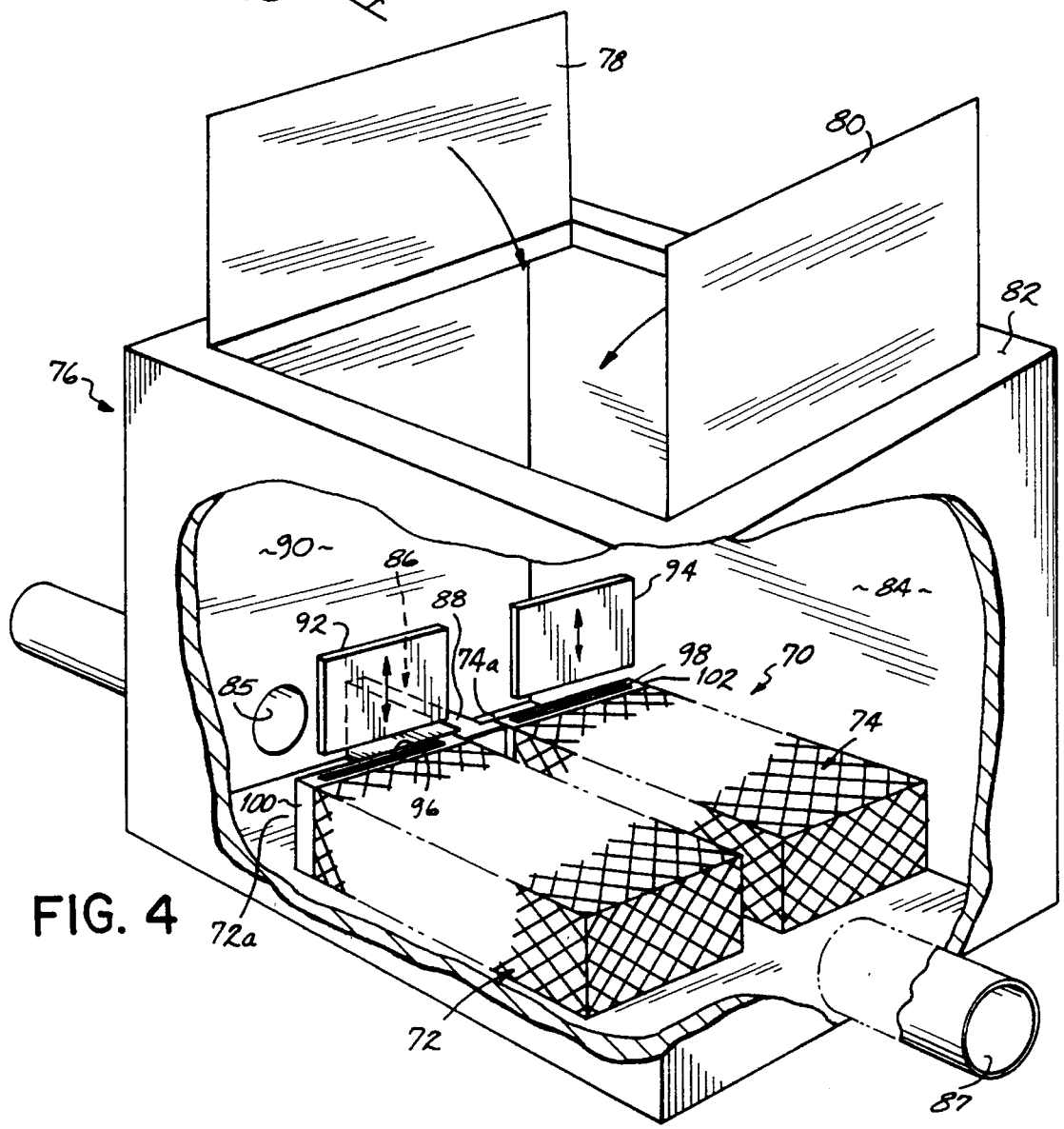

In accordance with a second embodiment of the invention, therefore, FIG. 4 shows a multibag system 70 which avoids this drawback and can provide continuous and uninterrupted capture of debris, for example, after a first or primary bag has been filled and during the process of removing and replacing it. System 70 includes an elongated primary collecting container 72 and an elongated secondary collecting container 74 disposed in parallel to primary container 72. Containers 72, 74 are perforated and preferably are bags formed of flexible mesh material as in the first embodiment. Each bag is closed on all sides except at one open inlet end 72a, 74a. The frame structure of each has not been illustrated in FIG. 4 for clarity, however, it will be appreciated that frame structure such as shown in FIG. 1 is preferably attached to each bag 72, 74.

As in the first embodiment, the second embodiment of FIG. 4 includes a substantially subterranean vault 76 having upper doors 78, 80 in a top surface 82 thereof which is designed to be substantially flush with the surrounding terrain. Vault 76 includes a lower chamber 84 which includes an inlet 85 and an outlet 87. Chamber 84 may be wider than chamber 18 of the first embodiment in order to accommodate multiple side-by-side collection bags. Secondary bag 74 is provided on the overflow side of a weir 86 which comprises a wall 88 extending from inner wall surface 90 of chamber 84 to an open inlet end 72a of bag 72 as in the first embodiment. Primary bag 72 fills with debris in the manner of bag 30 described in the first embodiment and, when bag 72 is full, debris passes by weir 86 over wall 88. As with the first embodiment, appropriate barriers (not shown) may be provided to ensure that the only alternate flow path is over wall 88. Preferably, a signalling system such as shown in FIG. 2 or 3 is used to indicate a full bag condition. In the interim time period before primary bag 72 has been emptied or replaced, water and debris will flow into secondary bag 74. Debris will therefore continue to be collected and trapped in bag 74 and water will continue to flow through outlet 87.

While bag servicing is performed, movable panels 92, 94 are preferably positioned in front of respective bags 72, 74, as necessary, prior to their removal from chamber 84. For example, panels 92, 94 may be disposed in respective slots 96, 98 of stationary frame structure 100, 102 to which bags 72, 74 are attached. Thus, for example, after bag 72 has been removed for replacement or emptying, panel 92 will force water and debris to be diverted over weir 86 and through inlet end 74a of bag 74. After replacement of bag 72 and removal of panel 92, panel 94 may be lowered to block inlet 74a and protect the system during removal and replacement of bag 74. In this way, the system is protected against passage of floatable debris both during an overflow condition and during collection bag removal and replacement.

Either one or both of panels 92, 94 may optionally be perforated to allow passage of water therethrough but prevent any substantial passage of debris. Similar solid or perforated closure panels may be used with single bag systems to provide a degree of protection during bag change, however, this would not provide the overflow protection of a multi-bag system.

Although preferred embodiments of the invention have been shown and described herein, many modifications and substitutions which fall within the spirit of the invention will be readily recognized by those of skill in this or related arts. Applicant therefore does not intend to be limited except by the scope of the appended claims.

What is claimed is:

1. Apparatus for trapping and collecting debris flowing through an underground drain conduit comprising:

a vault having a chamber with a chamber inlet and a chamber outlet;

an in-line trap disposed within said chamber between said chamber inlet and said chamber outlet for trapping and collecting debris entering at said chamber inlet thereby providing for an out-flow of substantially debris-free water, said trap formed by a perforated container structure having an open end spaced from and facing said chamber inlet and a closed end facing said chamber outlet, said chamber inlet, said open end and said chamber outlet being substantially aligned;

a bypass weir extending between the chamber inlet and the open end of said perforated container structure, said bypass weir extending substantially parallel to the alignment of said chamber inlet, said open end and said chamber outlet; and, an access opening in said vault sized to allow said trap to be removed therefrom.

2. The apparatus of claim 1 wherein said perforated container structure is connected to a frame structure.

3. The apparatus of claim 1 further comprising sensing and signalling means disposed adjacent said bypass weir for sensing and signalling the passage of solid debris past said bypass weir and around said trap thereby indicating that said trap is full of debris.

4. The apparatus of claim 3 wherein said sensing and signalling means comprises a mechanical structure which permits passage of water, but is displaced by impingement of solid debris passing by said bypass weir and around said trap, wherein displacement of said mechanical structure signals that said trap is full of debris.

5. The apparatus of claim 3 wherein said sensing and signalling means comprises an optical sensor for detecting the passage of debris past said bypass weir and around said trap, wherein upon detection of debris, said optical sensor signals that said trap is full of debris.

6. Apparatus for trapping and collecting debris flowing through an underground drain conduit comprising:

a vault having a chamber with a chamber inlet and a chamber outlet;

a first in-line trap formed by a first perforated container structure having an open end and a closed end and removably disposed within said chamber between said chamber inlet and said chamber outlet for trapping and collecting debris entering at said chamber inlet thereby providing for an out-flow of substantially debris-free water;

an access opening in said vault sized to allow said trap to be removed therefrom;

a second in-line trap formed by a second perforated container structure having an open end and a closed end and removably disposed within said chamber adjacent said first in-line trap and between said chamber inlet and said chamber outlet; and, a bypass weir extending between said chamber inlet and the respective open ends of said first and second perforated container structures to normally direct flow through said first perforated container structure, whereby when said first perforated container structure is full of debris, flow will be diverted past said bypass weir and through said second perforated container structure such that overflow debris is trapped and collected in said second perforated container structure.

7. The apparatus of claim 6 wherein said first and second perforated container structures are each connected to a frame structure.

8. The apparatus of claim 6 including a panel for closing an inlet of at least one of said first and second traps so as to temporarily prevent the passage of debris through said at least one of said first and second traps.

9. Apparatus for trapping and collecting debris flowing through an underground drain conduit comprising:

a vault having a chamber with a chamber inlet and a chamber outlet;

an in-line trap disposed within said chamber between said chamber inlet and said chamber outlet for trapping and collecting debris entering at said chamber inlet thereby providing for an out-flow of substantially debris-free water, said trap formed by a perforated container structure having an open end spaced from and facing said chamber inlet and a closed end facing said chamber outlet, said chamber inlet, said open end and said chamber outlet being substantially aligned;

a bypass weir extending between the chamber Inlet and the open end of said perforated container structure, said bypass weir extending substantially parallel to alignment of said chamber inlet, said open end and said chamber outlet;

an access opening in said vault sized to allow said trap to be removed therefrom; and, a panel for closing an inlet end of said trap so as to temporarily restrain passage of debris through said chamber.

10. Apparatus for trapping and collecting debris flowing through an underground drain conduit comprising:

a vault having a chamber with a chamber inlet and a chamber outlet;

an in-line trap disposed within said chamber between said chamber inlet and said chamber outlet for trapping and collecting debris entering at said chamber inlet thereby providing for an out-flow of substantially debris-free water, said trap formed by a perforated container structure having an open end spaced from and facing said chamber inlet and a closed end facing said chamber outlet, said perforated container structure being removable as a unit from said chamber to enable disposal of the debris, said chamber inlet, said open end and said chamber outlet being substantially aligned;

a bypass weir extending between the chamber inlet and the open end of said perforated container structure, said bypass weir extending substantially parallel to alignment of said chamber inlet, said open end and said chamber outlet; and, an access opening in said vault sized to allow said trap to be removed therefrom.

11. The apparatus of claim 10 further comprising sensing and signalling means disposed adjacent said bypass weir for sensing and signalling the passage of solid debirs past said bypass weir and around said trap thereby indicating that said trap is full of debris.

12. The apparatus of claim 11 wherein said sensing and signalling means comprises a mechanical structure which permits passage of water, but is displaced by impingement of solid debris passing by said bypass weir and around said trap, wherein displacement of said mechanical structure signals that said trap is full of debris.

13. The apparatus of claim 11 wherein said sensing and signalling means comprises an optical sensor for detecting the passage of debris past said bypass weir and around said trap, wherein upon detection of debris, said optical sensor signals that said trap is full of debris.

* * * * *